US009641249B2

(12) United States Patent
Kaneriya et al.

(10) Patent No.: US 9,641,249 B2
(45) Date of Patent: May 2, 2017

(54) SUPPORT FOR CONVERGED FIBER CHANNEL OVER ETHERNET (FCOE) TRAFFIC ON SOFTWARE DEFINED NETWORKS (SDNS)

(71) Applicant: Lenovo Enterprise Solutions (Singapore) Pte. Ltd., Singapore (SG)

(72) Inventors: Rupal A. Kaneriya, Fremont, CA (US); Ashish Kapur, Santa Clara, CA (US); Khurram Khani, Mountain House, CA (US); Vishal Shukla, Santa Clara, CA (US); Naveen Kumar Vemulapalli, San Jose, CA (US)

(73) Assignee: Lenovo Enterprise Solutions (Singapore) Pte, Ltd., Singapore (SG)

( * ) Notice: Subject to any disclaimer, the term of this patent is extended or adjusted under 35 U.S.C. 154(b) by 64 days.

(21) Appl. No.: 14/490,600

(22) Filed: Sep. 18, 2014

(65) Prior Publication Data

US 2016/0087845 A1    Mar. 24, 2016

(51) Int. Cl.
| | |
|---|---|
| *H04B 10/25* | (2013.01) |
| *H04L 12/931* | (2013.01) |
| *H04L 12/04* | (2006.01) |
| *H04L 29/08* | (2006.01) |
| *H04L 12/46* | (2006.01) |

(Continued)

(52) U.S. Cl.
CPC .............. *H04B 10/25* (2013.01); *H04L 12/04* (2013.01); *H04L 49/351* (2013.01); *H04L 67/1097* (2013.01); *H04L 12/4641* (2013.01); *H04L 45/22* (2013.01); *H04L 45/38* (2013.01)

(58) Field of Classification Search
CPC .......... H04L 41/12; H04L 12/04; H04B 10/25
See application file for complete search history.

(56) References Cited

U.S. PATENT DOCUMENTS

| | | |
|---|---|---|
| 2013/0028135 A1 | 1/2013 | Berman |
| 2013/0322237 A1 | 12/2013 | DeCusatis et al. |

(Continued)

OTHER PUBLICATIONS

"Fujitsu Developes SDN Technology to Accelerate Network Storage Access," Fujitsu Laboratories Ltd., Dec. 9, 2013, pp. 1-4.

(Continued)

*Primary Examiner* — Chi H Pham
*Assistant Examiner* — Kevin Lee
(74) *Attorney, Agent, or Firm* — Zilka-Kotab, P.C.

(57) ABSTRACT

In one embodiment, a system includes a software defined network (SDN) controller connected to SDN-capable switch(es), the SDN controller being configured to communicate with and program the SDN-capable switches, wherein each of the SDN-capable switches is configured to communicate with the SDN controller, one or more fiber channel forwarders (FCFs) connected to the SDN-capable switches, storage area network (SAN) fabric(s), and local area network (LAN) fabric(s), and at least one end node connected directly or indirectly to the SDN-capable switches and/or the one or more FCFs, wherein the SDN controller is configured to collect information from the one or more FCFs that corresponds with each of the one or more FCFs via fiber channel initialization protocol (FIP) advertisement frames, and create and manage a FCF database, the FCF database including the information that corresponds with each of the one or more FCFs.

15 Claims, 7 Drawing Sheets

(51) Int. Cl.
  *H04L 12/721*    (2013.01)
  *H04L 12/707*    (2013.01)

(56) References Cited

U.S. PATENT DOCUMENTS

| | | | |
|---|---|---|---|
| 2013/0322460 A1 | 12/2013 | DeCusatis et al. | |
| 2014/0365622 A1* | 12/2014 | Iyengar | H04L 67/1097 709/220 |
| 2015/0304158 A1* | 10/2015 | Dharmadhikari | H04L 41/046 714/37 |

OTHER PUBLICATIONS

Decusatis, C., "Towards an Open Data Center with an Interoperable Network: Enterprise Networking using Open Industry Standards," Enterprise Computing Community Conference 2012, Marist College Poughkeepsie, NY, Jun. 11-12, 2012, pp. 1-12.

Nakagawa et al., "DomainFlow: Practical Flow Management Method using Multiple Flow Tables in Commodity Switches," CoNEXT' 13, Dec. 9-12, 2013, p. 399-404.

Krutov et al., "IBM Flex System Networking in an Enterprise Data Center," ibm.com/redbooks, Second Edition, Aug. 2013, pp. 1-106.

* cited by examiner

SUPPORT FOR CONVERGED FIBER CHANNEL OVER ETHERNET (FCOE) TRAFFIC ON SOFTWARE DEFINED NETWORKS (SDNS)

BACKGROUND

The present invention relates to data center infrastructure and networking, and more particularly, this invention relates to supporting converged traffic on software defined networks (SDNs).

SDNs utilize a SDN controller that is configured to manage and configure various SDN-capable switches, virtual switches, and other networking devices, such that each SDN-capable switch is able to receive instructions, programming, etc., from the SDN controller, and execute switching, routing, etc., as specified by the SDN controller. In this way, the entire SDN may be controlled from a single point of contact, the SDN controller, and any changes that must take place in the SDN may be initiated by the SDN to ensure that the SDN operates efficiently and as desired by the administrator.

A converged Ethernet network may include both Ethernet and storage-based communications. Some exemplary storage-based communications that may be used in storage area networks (SANs) include Fiber Channel (FC), Internet Small Computer System Interface (iSCSI), remote direct access memory (RDMA), etc.

Once these storage-based communications are switched to a converged Ethernet network, the storage-based communications are no longer understood by the various networking devices therein. Accordingly, these storage-based communications are altered to be understood by the various networking devices of the converged Ethernet network. Some communications that may be used on converged Ethernet networks include Fiber Channel over Ethernet (FCoE), RDMA over Converged Enhanced Ethernet (RoCEE), etc.

This converged traffic may be utilized on a FCoE-based fabric. A FCoE-based fabric is not able to be controlled by an external SDN controller. The lossless nature of storage-based communications are achieved in Ethernet communications by multiple intelligent control protocols that are not compatible with storage-based communications, such as Data Center Bridging Exchange (DCBX), Priority Flow Control (PFC), Enhanced Transmission Selection (ETS), etc. In current technologies, there is no suitable way that the lossless nature of Ethernet may be achieved by using a SDN controller.

Another issue with current designs of converged Ethernet networks is that even if lossless functionality may be achieved, the logical mapping between storage-based communications and the Ethernet-based network is challenging, as this will also be based upon various intelligent protocols, such as FCoE, FCoE Initialization Protocol (FIP), etc.

BRIEF SUMMARY

In one embodiment, a system includes a software defined network (SDN) controller connected to one or more SDN-capable switches, the SDN controller being configured to communicate with and program the SDN-capable switches, wherein each of the SDN-capable switches is configured to communicate with the SDN controller, one or more fiber channel forwarders (FCFs) connected to the one or more SDN-capable switches, one or more storage area network (SAN) fabrics, and one or more local area network (LAN) fabrics, and at least one end node connected directly or indirectly to the one or more SDN-capable switches and/or the one or more FCFs, wherein the SDN controller is configured to collect information from the one or more FCFs that corresponds with each of the one or more FCFs via fiber channel initialization protocol (FIP) advertisement frames, and create and manage a FCF database, the FCF database including the information that corresponds with each of the one or more FCFs.

In another embodiment, a computer program product includes a computer readable storage medium having program instructions embodied therewith, the program instructions being readable and/or executable by a SDN controller to cause the SDN controller to: communicate with and program, by the SDN controller, one or more SDN-capable switches when the SDN-capable switches are connected to the SDN controller, collect, by the SDN controller, information from one or more FCFs via FIP advertisement frames when the one or more FCFs are connected to the SDN controller, the information corresponding with each of the one or more FCFs, and create and manage, by the SDN controller, a FCF database, the FCF database including the information that corresponds with each of the one or more FCFs, wherein the one or more FCFs are configured to connect to the one or more SDN-capable switches, one or more SAN fabrics, and one or more LAN fabrics.

In another embodiment, a computer program product includes a computer readable storage medium having program instructions embodied therewith, the program instructions being readable and/or executable by a FCF to cause the FCF to: act as a SAN gateway for any storage-based communications received from and/or sent to one or more SAN fabrics connected to the FCF, support a fiber channel over Ethernet (FCoE) session with at least one end node connected directly or indirectly to one or more SDN-capable switches and/or the FCF when the at least one end node is located in the one or more SAN fabrics, and periodically send a unicast FIP advertisement frame to a SDN controller connected to the FCF and the one or more SDN-capable switches.

Other aspects and embodiments of the present invention will become apparent from the following detailed description, which, when taken in conjunction with the drawings, illustrate by way of example the principles of the invention.

DETAILED DESCRIPTION

Figure 1:
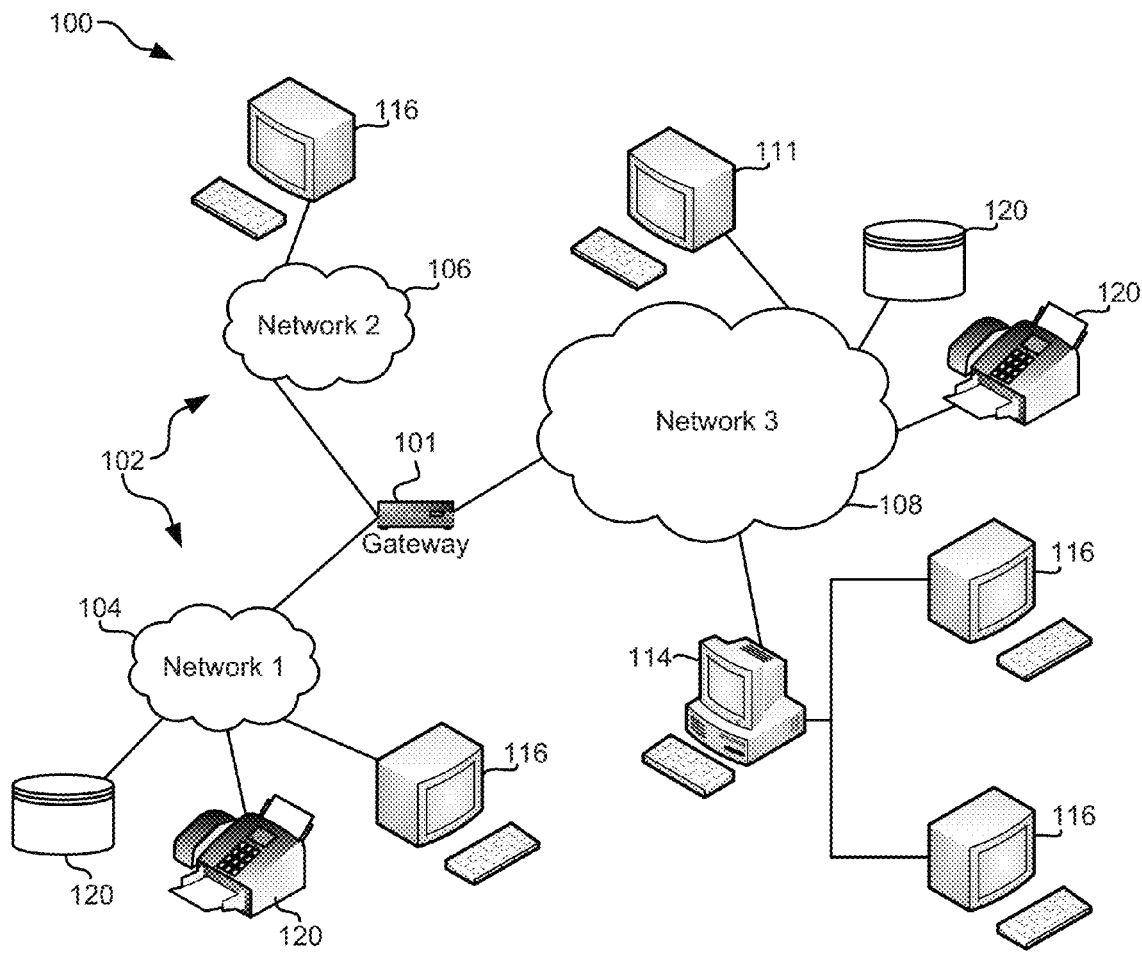
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for supporting converged traffic on software defined networks (SDNs).

In one general embodiment, a system includes a SDN controller connected to one or more SDN-capable switches, the SDN controller being configured to communicate with and program the SDN-capable switches, wherein each of the SDN-capable switches is configured to communicate with the SDN controller, one or more fiber channel forwarders (FCFs) connected to the one or more SDN-capable switches, one or more storage area network (SAN) fabrics, and one or more local area network (LAN) fabrics, and at least one end node connected directly or indirectly to the one or more SDN-capable switches and/or the one or more FCFs, wherein the SDN controller is configured to collect information from the one or more FCFs that corresponds with each of the one or more FCFs via fiber channel initialization protocol (FIP) advertisement frames, and create and manage a FCF database, the FCF database including the information that corresponds with each of the one or more FCFs.

In another general embodiment, a computer program product includes a computer readable storage medium having program instructions embodied therewith, the program instructions being readable and/or executable by a SDN controller to cause the SDN controller to: communicate with and program, by the SDN controller, one or more SDN-capable switches when the SDN-capable switches are connected to the SDN controller, collect, by the SDN controller, information from one or more FCFs via FIP advertisement frames when the one or more FCFs are connected to the SDN controller, the information corresponding with each of the one or more FCFs, and create and manage, by the SDN controller, a FCF database, the FCF database including the information that corresponds with each of the one or more FCFs, wherein the one or more FCFs are configured to connect to the one or more SDN-capable switches, one or more SAN fabrics, and one or more LAN fabrics.

In another general embodiment, a computer program product, includes a computer readable storage medium having program instructions embodied therewith, the program instructions being readable and/or executable by a FCF to cause the FCF to: act as a SAN gateway for any storage-based communications received from and/or sent to one or more SAN fabrics connected to the FCF, support a fiber channel over Ethernet (FCoE) session with at least one end node connected directly or indirectly to one or more SDN-capable switches and/or the FCF when the at least one end node is located in the one or more SAN fabrics, and periodically send a unicast FIP advertisement frame to a SDN controller connected to the FCF and the one or more SDN-capable switches.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120. e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
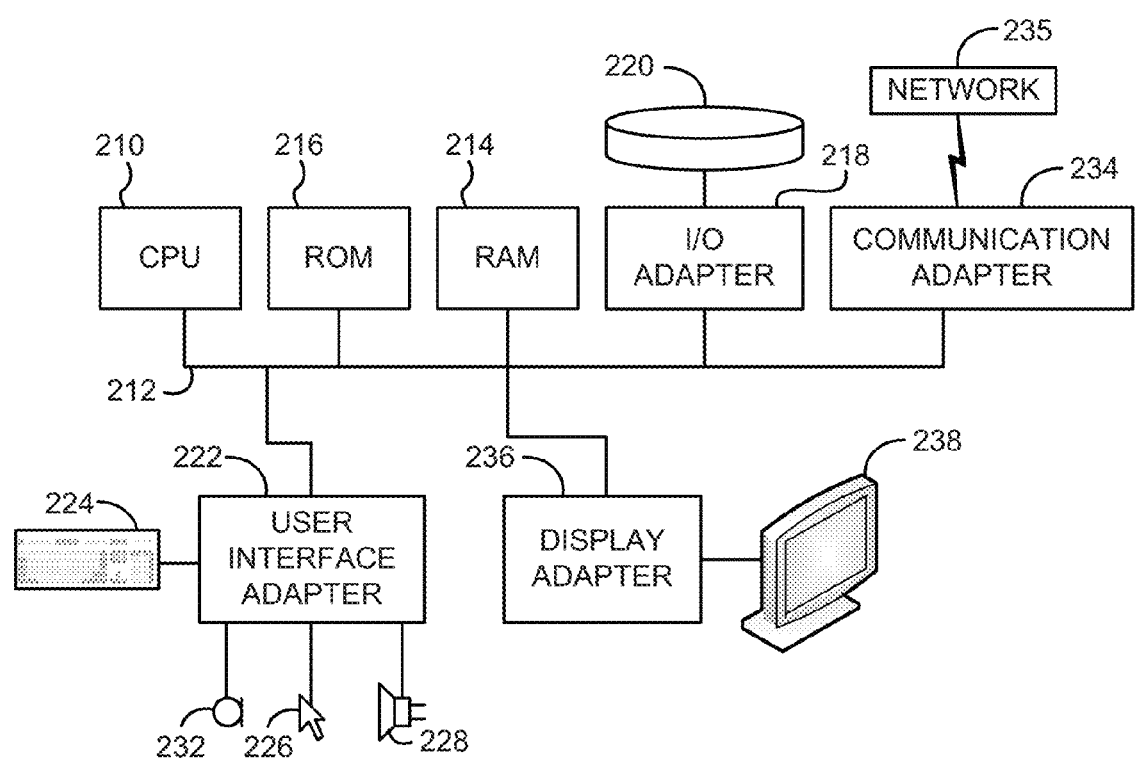
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
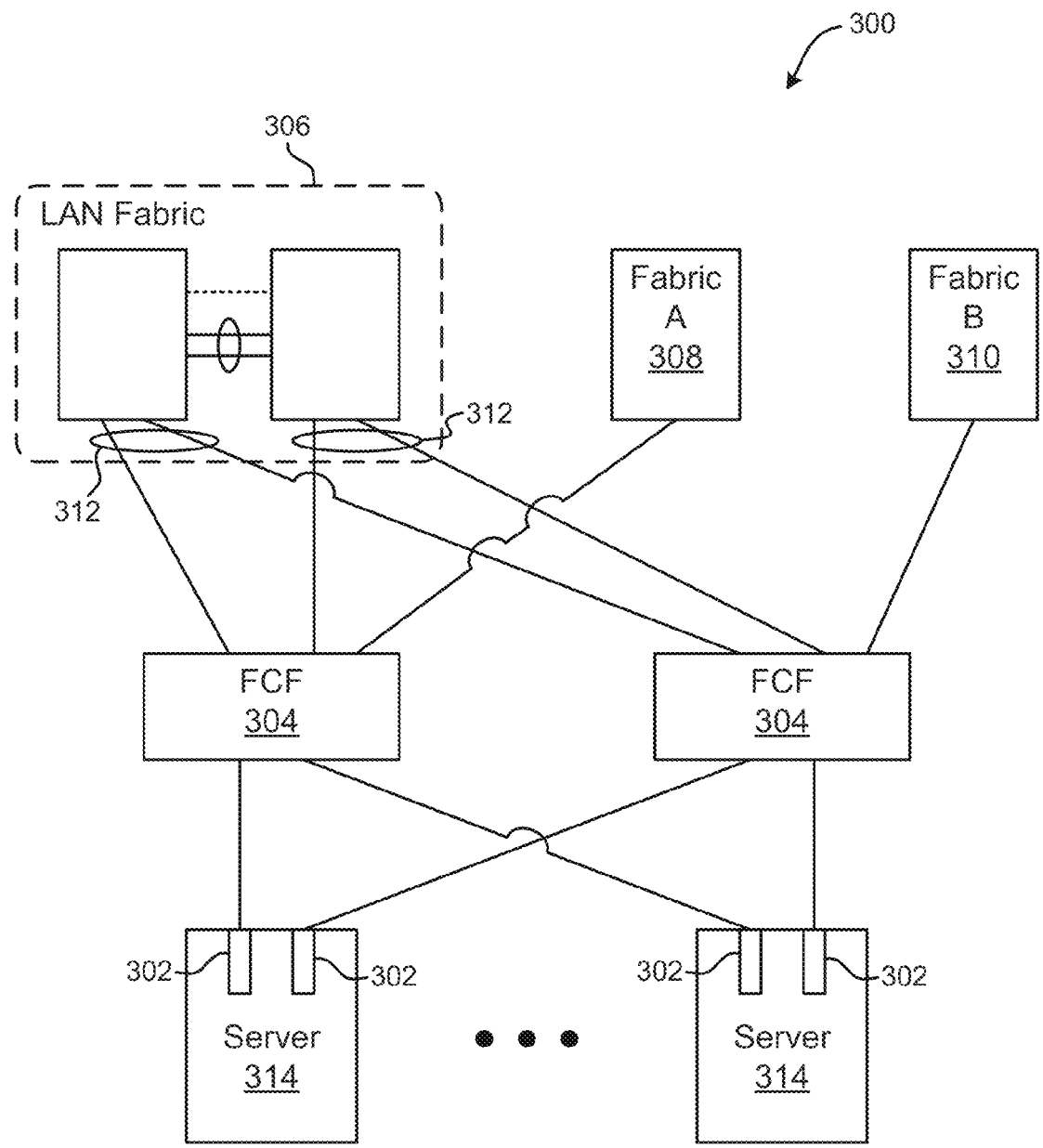
FIG. 3 shows a software defined network (SDN) depicting storage-based communications deployment in a data center according to one embodiment.

Now referring to FIG. 3, a SDN 300 depicting storage-based communications deployment in a data center is shown according to one embodiment. Note that some of the elements shown in FIG. 3 may be implemented as hardware and/or software, according to various embodiments. For the sake of this description, the storage-based communications include Fiber Channel over Ethernet (FCoE), but any suitable protocol may be used as known in the art.

The SDN 300 includes one or more servers 314, each server 314 having at least one converged network adapter (CNA) 302, each CNA 302 being connected to fiber channel forwarders (FCFs) 304. The CNAs 302 may be generation 2 CNAs, in one embodiment. The FCFs 304 may be connected to any number of fabrics, such as a LAN fabric 306, Fabric A 308, and/or Fabric B 310, among other possible fabrics. When connecting to any of the various fabrics, a multi-switch port channel 312 may be used, as shown in the connections with the LAN fabric 306.

When the Ethernet converged networks are to be expanded on the SDN 300, or FCFs 304 are to communicate with SDN controllers to operate seamlessly, the SDN protocol, such as OpenFlow or some other suitable SDN protocol, is not capable of handling such actions with current OpenFlow standards. The current deployments of OpenFlow are purely for Ethernet only.

A SDN controller in typical deployments is not able to handle FC and/or FCoE traffic or fabrics, as there will be multiple pieces of FCoE which would need support by the SDN controller which makes the FCoE traffic lossless on the Ethernet side (via ETS, PFC, DCBX, etc.). The SDN controller still does not understand any of these protocols.

Currently in any data center environment, FCoE Initiation Protocol (FIP) is used to establish and manage FCoE transmissions. There are nine functions that FIP provides:

1. FIP VLAN Discovery—Used by a FCoE initiator to discover FCoE VLAN(s). The FIP VLAN Discovery frame and the FIP Discovery solicitation frame are sent by the end node as a multicast frame with the destination set as ALL_FCF_MACs. An end node is any device which is connected at an end of the fabric, such as a virtual machine (VM) in a server, an appliance, etc.

2. FIP Discovery Solicitation—Used by the FCoE initiator to discover a FCF.

3. FIP Discovery Advertisement—Used by the FCF to advertise itself to end nodes in a fabric.

4. FIP Fabric Login (FLOGI) Process—Used by the FCoE initiator to send a Login request to the FCF.

5. FIP Login Process—The FCF uses an accept message (FIP LS_ACC) or a reject message (FIP LS_RJT) to allow or disallow a login request.

6. FIP LOGO—Sent by an end node to logout.

7. FIP NPIV FDISC—Sent by one of the VN_ports to login.

8. FIP KeepAlive—Every eight seconds, the end node sends a KeepAlive message to the FCF.

9. FIP Clear Virtual Link—Used by the FCF to signal to the end node to bring down the virtual link.

The FCoE login phase handling the FC commands to port login and name server registration and low-level SCSI commands are handled as follows:

1. FCoE/FC Commands—End node sends a port login (PLOGI) message to the NS to register into the Fabric.

2. FCoE/FC Commands—The end node sends a PRLI message to establish a connection at a high level.

In a Layer-2 (L2) environment, these frames may be received by all FCFs. When a FCF receives a FIP VLAN discovery, the FCF may send an unicast frame back to the end node. Upon receiving the VLAN reply from the FCF, the end node is aware of the list of VLANs for FCoE, and upon receiving a Solicitation reply, the end node is aware of the list of FCFs which are available to be used to establish a FCoE session.

Also, with the above information, the end node may then send a FIP FLOGI to establish a FCoE session with one particular FCF in one particular VLAN. After the FCoE session is established between the end node and the FCF, a KeepAlive message is sent regularly (every eight seconds) between the VN port of the end node and the FCF. When a KeepAlive message is missed for a certain predetermined amount of time, the FCF may send a CVL message to the end node to clear the FCoE session.

Another requirement in the use of FCoE is to be truly lossless. This lossless behavior is achieved in a fabric using DCBX, PFC, ETS, etc. The end node sends a 802.1Q VLAN tag packet with a priority set to 3 to the FCF. Currently, PFC/ETS is set using DCBX negotiation. Before a FCoE session is established, DCBX is used to exchange PFC/ETS/Application type-length-values (TLVs) to ensure that a FIP/FCoE frame is sent using priority 3 in the 802.1Q VLAN tag header, to denote PFC. In other embodiments, a different priority other than 3 may be used to denote other types of traffic, as long as it is agreed upon by all devices used in the fabric.

One implementation of storage-based communications in a SDN, according to one embodiment, is described below. For the sake of this description, it is assumed that the SDN operates according to OpenFlow standards and that the storage-based communications utilize FC and FCoE.

With the OpenFlow specification, FCoE deployment may be managed by the OpenFlow controller. The OpenFlow controller may collect information of all FCFs, and therefore is configured to perform some or all of the following functions:

1. Enable CEE on the OpenFlow controller.

2. Monitor all FCF switches and receive a list of all FCFs in the fabric.

3. Configure PFC/ETS information using the OpenFlow controller.

4. Enable a FCoE VLAN for each FCF.

5. Each switch logs in with the FCF via the OpenFlow controller.

6. Determine a list of established FCoE sessions for each FCF.

7. Create a FC domain-ID for each FCF.

8. Create a FCF-MAP, FCF-Priority, and FCF KeepAlive timer for each FCF.

9. Create a Zone/Zoneset for each FCoE VLAN in Full Fabric Mode.

10. Determine a list of all end nodes when a FIP discovery message is sent to ALL_FCF_MAC, the list being sent to the OpenFlow controller.

When the OpenFlow controller has access to all of the information described above, either from specific actions configured to retrieve such information, or from receiving the information from one or more other devices, the OpenFlow controller will be capable of performing any of the following actions:

1. FIP VLAN discovery messages and FIP Discovery Solicitation messages sent by the end nodes may be handled by the OpenFlow controller in an efficient manner not possible in typical installations.

2. The FCFs will not be involved in FIP VLAN discovery and a FCF solicitation response phase. Instead, the OpenFlow controller is configured to handle FIP VLAN discovery and FCF discovery based on information from all the FCFs in the fabric.

3. Before the OpenFlow controller informs the end node which FCF to use to establish FCoE, the OpenFlow controller may program the PFC/ETS configuration for all switches in a path between the end node and the assigned FCF. Then, any OpenFlow-enabled switch will send a TLV message to the OpenFlow controller that the bandwidth consumption is more than configured.

Figure 4:
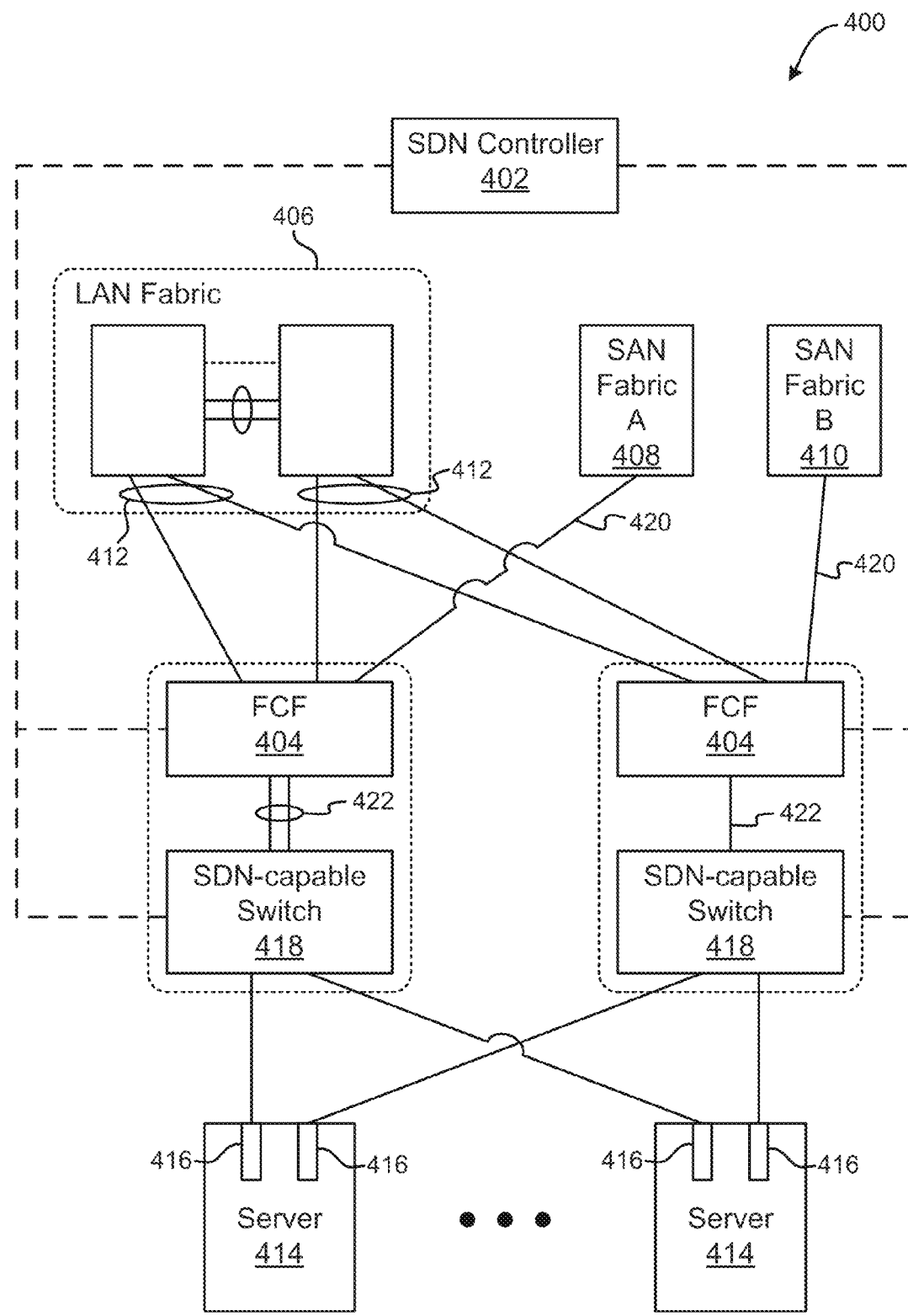
FIG. 4 shows a SDN fabric according to one embodiment.

Referring now to FIG. 4, a SDN fabric 400 is shown according to one embodiment. The SDN fabric 400 comprises a SDN controller 402 in communication with one or more FCFs 404, and one or more servers 414, each server 414 having at least one converged network adapter (CNA) 416, each CNA 416 being connected to one or more SDN-capable switches 418. The SDN-capable switches 418 are connected to the one or more FCFs 404 and are in communication with the SDN controller 402. The CNAs 416 may be FIP-enabled generation 2 CNAs, in one embodiment. The FCFs 404 may be connected to any number of fabrics, such as a LAN fabric 406, SAN Fabric A 408, and/or SAN Fabric B 410, among other possible Ethernet and storage-based fabrics. When connecting to any of the various fabrics, a multi-switch port channel 412 may be used, as shown in the connections with the LAN fabric 406.

In one embodiment, the SDN controller 402 may be configured to collect information from and manage the information for all FCFs 404 in the SDN fabric 400. Also, FIP VLAN discovery and FIP Discovery Solicitation frames sent from any end nodes may be forwarded to the SDN controller 402. Since the SDN controller 402 is configured to manage the list of FCFs 404, the SDN controller 402 is also configured to respond to the end node with FIP VLAN requests and FIP solicitations. Also, the SDN controller 402 is configured to program flows detailing how to reach a FCF 404 for each end node in the SDN fabric 400. In addition, the SDN controller 402 may be configured to mark this particular flow as a bandwidth aware flow on all SDN-capable switches 418 in the path from the end node to the FCF 404. Then, when any SDN-capable switch 418 in a particular flow path detects that a bandwidth exceeds a predetermined bandwidth for that particular flow, the SDN-capable switch 418 sends a message to the SDN controller 402 indicating this condition. In response, the SDN controller 402 may instruct each SDN-capable switch 418 in the path to perform backpressure flow, such as via priority flow control (PFC) or some other suitable flow control mechanism.

The FCFs 404 are each configured to act as a gateway for any storage-based communications, e.g., to act as FCoE gateways for FCoE traffic, as RDMA gateways for RDMA traffic, etc. Therefore, each FCF 404 is connected to a SAN fabric (such as SAN Fabric A 408, SAN Fabric B 410, etc., using one or more FC links 420. FCoE end nodes are connected to one or more of the various SDN-capable switches 418. The FCF 404 may be connected to one or more of the SDN-capable switches 418 via a plurality of connections 422, such as a link aggregation group (LAG), etc., or via single connections having high throughput. Each set of SDN-capable switch(es) 418 and FCF 404 act together as a unit to handle traffic from fabrics (storage-based communications) and Ethernet networks (Ethernet communications).

Each end node may establish a FCoE session with any of the FCFs 404, and start a SCSI flow with storage device(s) in one of the SAN fabrics. Each storage device may communicate using any storage-based communication protocol that is understood by the FCF 404, such as FC, RDMA, etc. Also, each end node may also start a SCSI flow with any other FCoE target end node with a FCoE session. Embodiments directed at accomplishing this functionality are described below in more detail.

In typical fabric implementations, all FCFs 404 advertise themselves periodically to other devices in the fabric. In a SDN environment, such as a fabric utilizing OpenFlow, according to one embodiment, a SDN-capable switch 418 may be configured to support a FCF 404 and is also configured to be able to communicate via the SDN protocol with the SDN controller 402. Therefore, instead of broadcasting advertisement frame FIP, advertisement may be sent only to the SDN controller 402 in a unicast packet. The SDN controller 402 is configured to maintain the list of FCFs 404 available in the SDN fabric 400, and also keep trace detail information for each FCF 404. The trace detail information may include any of the following: FCoE VLAN, FCF-MAP, MAC address, etc.

In this embodiment, when an end node sends a FIP VLAN discovery message, the frame is received at one of the SDN-capable switches 418. Under supervision of the particular SDN protocol being used, when a first frame is sent to any unknown MAC is forwarded on to the SDN controller 402 in one embodiment. When the SDN controller 402 receives this FIP VLAN request frame, the SDN controller 402 is configured to check an internal FCF database, and send FCoE VLANs for some or all FCFs, depending on the knowledge of which VLANs the SDN supports to achieve better performance.

In one approach, when an end node sends a FIP discovery solicitation, the frame is received at one of the SDN-capable switches 418. Each of the SDN-capable switches 418 are configured to send or forward to the SDN controller 402 a first frame received at the SDN-capable switch 418 that is sent to any unknown MAC address. When the SDN controller 402 receives this FIP discovery solicitation frame, the SDN controller 402 is configured to check the internal FCF database, and send a full or partial list of FCFs in the SDN fabric 400, depending on the knowledge of which FCFs 404 the SDN controller 402 supports to achieve better performance.

According to one embodiment, each group of FCF information that the SDN controller 402 sends to one of the SDN-capable switches 418 is sent back to the end node by the SDN-capable switch 418 which receives it. Also, the SDN controller 402 is configured to send a flow command to instruct the SDN-capable switch 418 in a flow path to add a flow corresponding to how to reach a FCF 404 in the flow path.

Also, for each group of FCF information which the SDN controller 402 sends back to an end node, the SDN controller 402 is configured to send a flow command to instruct a SDN-capable switch 418 in the flow path to add a flow corresponding to how to reach the FCF 404 in the flow path. The SDN-capable switch 418 is also configured to send the flow to all other SDN-capable switches 418 in the flow path from the SDN-capable switch 418 where the end node is connected to the FCF 404 in the flow path to start bandwidth programming. Upon bandwidth programming being completed successfully on all SDN-capable switches 418 in the flow path, the SDN-capable switch 418 is configured to send an acknowledgement back to the SDN controller 402 before the SDN-capable switch 418 is able to send a reply to the FCF solicitation.

In one embodiment, after the FCF solicitation reply is received by the end node, the end node is allowed to start the FIP login process (FIP-FLOGI). FIP-FLOGI is sent via an unicast frame. Since the flow is not added, the FIP-FLOGI is sent to the SDN controller 402. When the SDN controller 402 receives the FIP-FLOGI frame, the SDN controller 402 is configured to forward this frame to the appropriate FCF 404. The FCF 404 is configured to handle this FIP-FLOGI frame in the same way that FCFs currently handle FIP-FLOGI frames. When the FCF 404 sends the acceptance to the FIP login request (LS_ACC), the frame is forwarded to the SDN controller 402. The SDN controller 402 is configured to examine the FC-ID field in the FLOGI-ACC, and add the flow to the FCF 404 corresponding to how to reach this virtual port. After that, the SDN controller 402 is configured to send a FIP login response (LS_ACC or LS_RJT) to the end node, and also add the corresponding flow on the SDN-capable switch 418 to create the flow from the end node to the FCF 404.

Since the SDN controller 402 acts as a middle man for each FIP-FLOGI, the SDN controller 402 is in position to track how many FCoE sessions are established for each FCF 404. With this knowledge, the SDN controller 402 is configured to apply intelligence to achieve better load-balancing and performance across the SDN fabric 400.

In another embodiment, as the FC-BB-5 standard requires, a FIP KeepAlive message should be sent from an end node or Virtual Network (VN) port regularly to the corresponding FCF 404, and the FCF 404 should send an advertisement regularly.

In yet another embodiment, each end node may perform explicit logout. The logout frame is sent to the FCF 404 directly. When the FCF 404 receives the logout frame from the end node, the SDN controller 402 is configured to inform a SDN-capable switch 418 to remove the flow corresponding to both the VN-port on the FCF 404, and the FCF 404 on the SDN-capable switch 418 connected to the end node in the flow path. The SDN controller 402 is also configured to update an internal database to update the FCoE session.

When the end node stops sending KeepAlive messages for more than a predetermined amount of time, e.g., 30 missed cycles, 60 missed cycles, 90 missed cycles, 120 missed cycles, etc., which may equate to 75 seconds, 150 seconds, 225 seconds, 300 seconds, or more, the FCF 404 is configured to send a CVL to clear the FCoE session. Meantime, the SDN controller 402 is configured to inform a SDN-capable switch 418 to remove the flow corresponding to both the VN-port on the FCF 404, and the FCF 404 on the SDN-capable switch 418 connected to the end node in the flow path. The SDN controller 402 is also configured to update an internal database to update the FCoE session.

Figure 5:
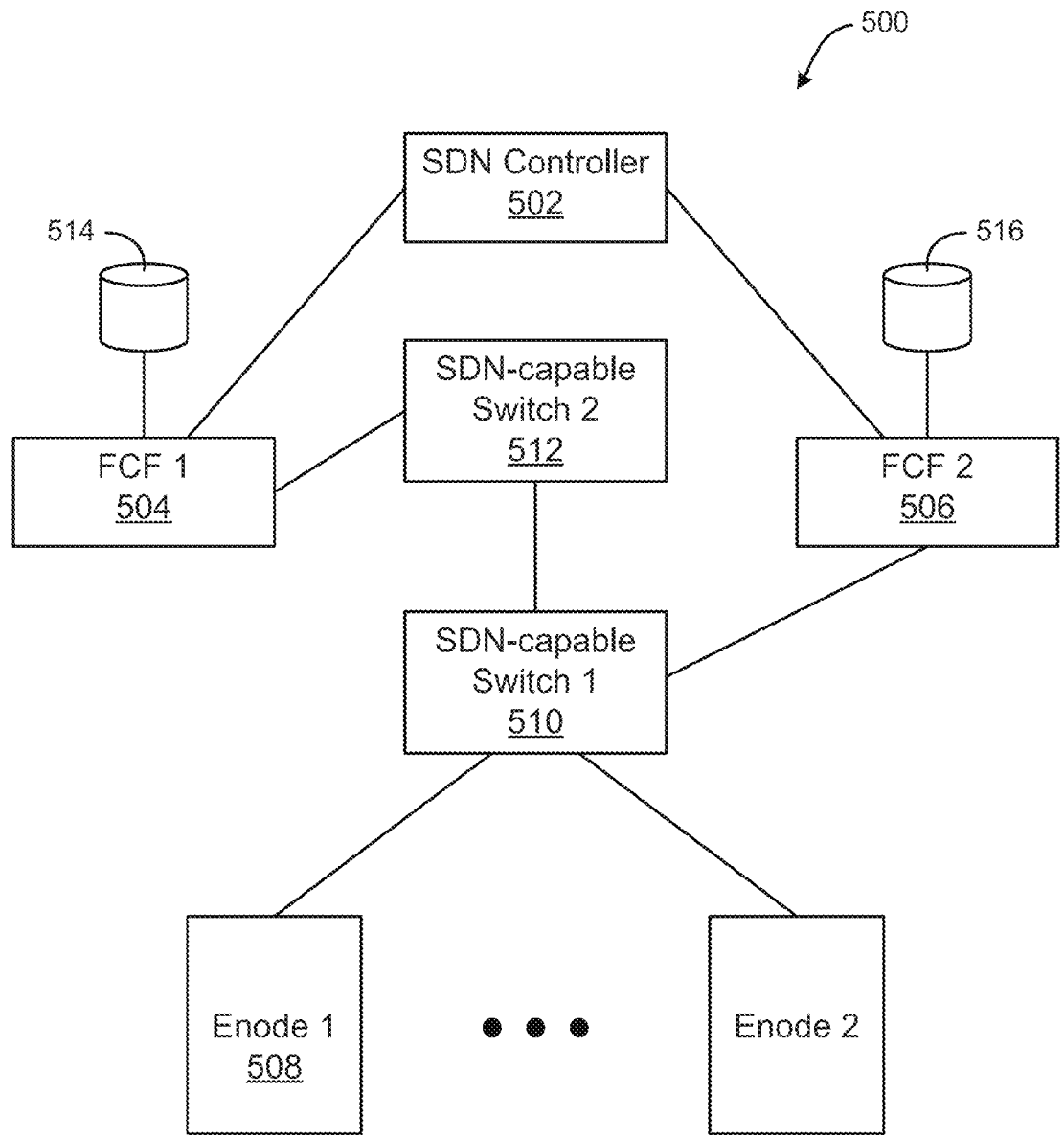
FIG. 5 shows an exemplary network in one approach.

According to one exemplary network 500, as shown in FIG. 5, both FCF 1 504 and FCF 2 506 send an advertisement including: FCF_MAP, FCF_priority, FCF_KeepAlive-timer, FCF MAC, and FCoE VLAN, to the SDN controller 502. The SDN controller 502 keeps track of all FCFs in the network. For each FCF, the SDN controller 502 maintains an entry, such as: Index, FCF_MAC, FCoE_VLAN, FCF_MAP, FCF-Priority, load.

In the topology shown in FIG. 5, in the SDN controller 502 there are two entries: 1, 11:22:33:44:55:66, 1001, 0x0efc00, 1, 0; and 2, 22:33:44:55:66:77, 1002, 0x0efc00, 2, 0.

In this example, end node (Enode) 1 508 may send a FIP VLAN discovery message to ALL_FCF_MACs. The frame is sent to the SDN controller 502 once received at any device. Upon receiving the FIP VLAN discovery message, the SDN controller 502 checks the FCF database, sends an appropriate FIP VLAN reply to Enode 1 508 which includes two VLANs: 1001 and 1002.

In a further example, Enode 1 508 sends a FCF solicitation to ALL_FCF which is sent to the SDN controller 502 in all allowed VLANs. The SDN controller 502 checks its internal FCF database, and sends a FIP advertisement with the S bit set to Enode including two FCFs along with VLAN information as follows:

1. When the port connected to Enode 1 508 only allows VLAN 1001, FCF solicitation is sent in VLAN 1001 only.

2. When the port connected to Enode 1 508 only allows VLAN 1002, FCF solicitation is sent in VLAN 1002 only.

3. When the port connected to Enode 1 508 allows VLAN 1001 and 1002, FCF solicitation is sent in VLAN 1001 and 1002.

4. After Enode 1 508 receives the FCF advertisement from the SDN controller 502, in case of multiple replies sent back to Enode 1 508, it decides which FCF is used to perform FIP-FLOGI based on information available to the Enode. Then, a FIP-FLOGI is sent to the SDN controller 502.

5. When the SDN controller 502 receives the FIP-FLOGI, the frame is forwarded to the appropriate FCF. It is up to the FCF to send a LS_ACC or LS_RJT. Either ACC or RJT should be sent to the SDN controller 502. Before the LS_ACC is sent to Enode 1 508, a flow has to be established on both the FCF 1 504 and the SDN-capable switch 2 512 and SDN-capable switch 1 510. In case of LS_RJT, the RJT may be forwarded directly.

For example, when a FIP-FLOGI is sent to FCF 1 504 in VLAN 1001 and is received by the SDN controller 502, it is forwarded to FCF 1 504. FCF 1 504 sends an ACC including FC-ID 0x010101. The SDN controller 502 adds the flow on FCF 1 504 regarding how to reach VN port 0x0efc00010101, and also adds the flow on SDN-capable switch 1 510 for the flow to reach FCF 1: 0x112233445566.

6. Before the ACC for FIP-FLOGI is sent from the SDN controller 502, the SDN controller 502 programs CEE for all SDN-capable switches along the entire path. On both switch 1 510 and switch 2 512, PFC/ETS is programmed for FCoE applications.

7. After the flow is added, CEE is programmed and ACC for FLOGI may be forwarded to Enode 1 508. Now the FCoE session is established between FCF 1 504 and Enode 1 508.

8. When Enode 1 508 needs to send a SCSI frame to FCF storage 1 514 (assuming FCF storage 1 514 finishes FLOGI, and has a FC-ID of 0x010200, zoning is configured on FCF 1 504 to allow Enode 1 508 and FCF storage 1 514), VN port 0x0efc0010101 sends a name server inquiry to a Name Server. This FCoE frame uses FCF 1 504 as the destination MAC. Since there is already a flow added on switch 2 512, the frame is sent to FCF 1 504 directly. When FCF 1 504 receives this frame, the Name Server running on FCF 1 504 sends back a reply to the VN port directly.

9. After the VN port receives the reply from the Name Server which includes FCF storage 1 514 (FC-ID: 0x010200), VN port starts to send a SCSI frame to this FC-ID. This FCoE frame uses FCF 1 504 MAC as the destination MAC address, and is forwarded directly to FCF 1 504. FCF 1 504 then forwards this frame to FCF storage 1 514 based on FC forwarding.

10. Once the FCoE traffic flow reaches a predetermined bandwidth threshold (such as 40%, 50%, 60%, 75%, etc.) of line rate traffic, the SDN-capable switch sends a message to the SDN controller 502 indicating that a bandwidth exceeds a predetermined bandwidth for that particular flow. In response, the SDN controller 502 may instruct each SDN-capable switch in the path to perform backpressure flow, such as via PFC or some other suitable flow control mechanism. In one example, the SDN controller 502 sends a PAUSE messages to the SDN-capable switch to hold the FCoE traffic so the SDN-capable switch triggers the PFC PAUSE-based frames that are capable of being understood by the FCoE traffic generator (Server/Storage). All FCoE packets may be encapsulated in SDN packets, such as OpenFlow packets, when applicable.

Figure 6:
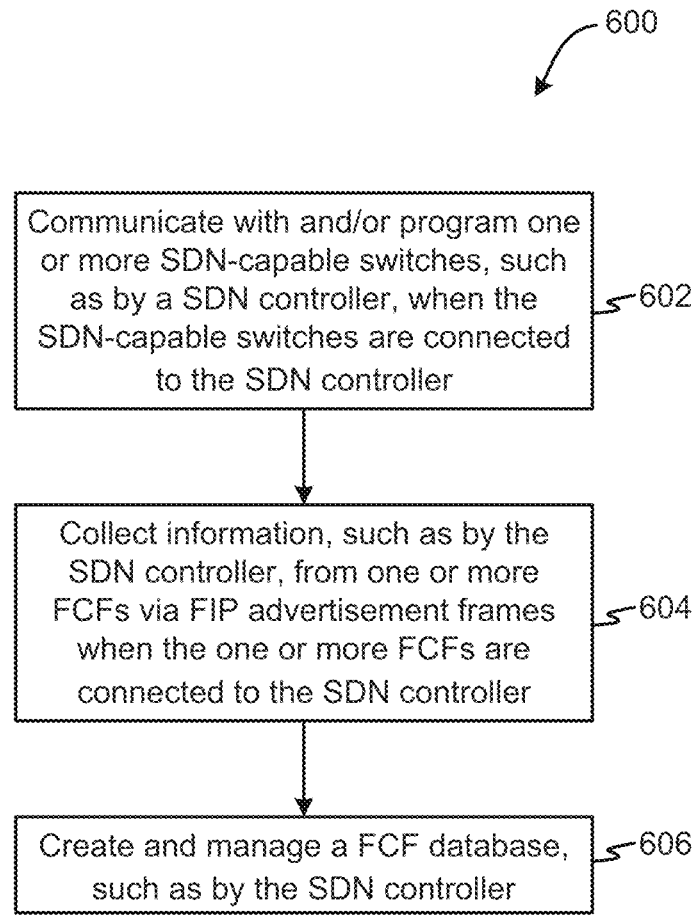
FIG. 6 shows a flowchart of a method in one embodiment.

Now referring to FIG. 6, a flowchart of a method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a SDN controller, a SDN-capable switch, a FCF, an end node, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where one or more SDN-capable switches are communicated with and/or programmed, such as by a SDN controller, when the SDN-capable switches are connected to the SDN controller. This programming may include configuring flows, erasing flows, modifying flows, enabling functionality, disabling functionality, etc. Communications may include information collection and dispersal, status updating, packet transmission (control and/or data), etc.

In operation 604, information is collected, such as by the SDN controller, from one or more FCFs via FIP advertisement frames when the one or more FCFs are connected to the SDN controller. The information corresponds with each of the one or more FCFs, such as name, unique ID, status, flows in which the FCF is involved, etc. The one or more FCFs are configured to connect to the one or more SDN-capable switches, one or more SAN fabrics, and one or more LAN fabrics.

In operation 606, a FCF database is created and managed, such as by the SDN controller. The FCF database includes the information that corresponds with each of the one or more FCFs that exist in the SDN fabric overseen by the SDN controller.

Figure 7:
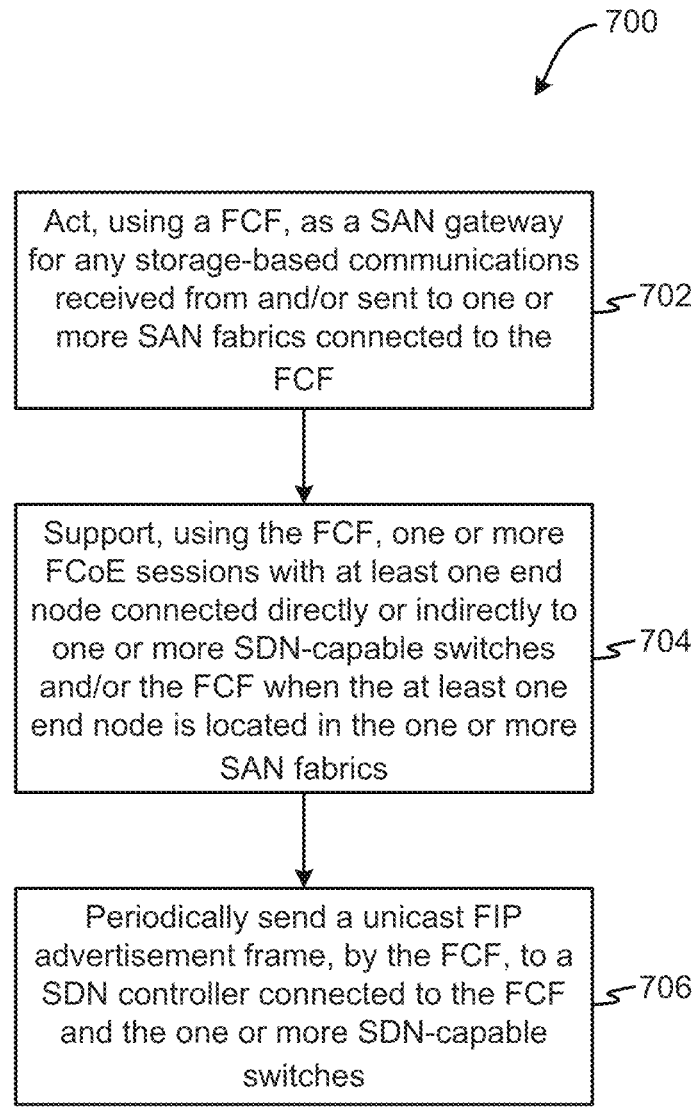
FIG. 7 shows a flowchart of a method in another embodiment.

Now referring to FIG. 7, a flowchart of a method 700 is shown according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a SDN controller, a SDN-capable switch, a FCF, an end node, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a FCF acts as a SAN gateway for any storage-based communications received from and/or sent to one or more SAN fabrics connected to the FCF. In this way, storage-based traffic, such as FC, RDMA, etc., may be handled by the FCF.

In operation 704, one or more FCoE sessions with at least one end node connected directly or indirectly to one or more SDN-capable switches and/or the FCF are supported by the FCF when the at least one end node is located in the one or more SAN fabrics.

In operation 706, a unicast FIP advertisement frame is periodically sent, by the FCF, to a SDN controller connected to the FCF and the one or more SDN-capable switches. In this way, the existence of the FCF is updated to the SDN controller, which may store this information in a FCF database stored local to the SDN controller.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a software defined network (SDN) controller connected to one or more SDN-capable switches, the SDN controller being configured to communicate with and program the one or more SDN-capable switches, wherein each of the one or more SDN-capable switches is configured to communicate with the SDN controller;
one or more fiber channel forwarders (FCFs) connected to the one or more SDN-capable switches, one or more storage area network (SAN) fabrics, and one or more local area network (LAN) fabrics; and
at least one end node connected directly or indirectly to the one or more SDN-capable switches and/or the one or more FCFs,
wherein the SDN controller is configured to:
collect information from the one or more FCFs that corresponds with each of the one or more FCFs via fiber channel initialization protocol (FIP) advertisement frames;
create and manage a FCF database, the FCF database comprising the information that corresponds with each of the one or more FCFs;
program one or more flows into each node detailing how to reach the one or more FCFs;
mark each programmed flow as a bandwidth aware flow on the one or more SDN-capable switches; and
instruct each switch in a first path to perform backpressure flow via priority flow control (PFC) when a bandwidth in the first path exceeds a predetermined bandwidth threshold.

2. The system as recited in claim 1, wherein the SDN controller is further configured to:
receive at least one of: a FIP virtual local area network (VLAN) discovery frame and a FIP discovery solicitation, forwarded from the at least one end node;
check the FCF database for fiber channel over Ethernet (FCoE) VLANs;
respond to the at least one end node with a FIP VLAN request comprising FCoE VLANs for some or all of the one or more FCFs in response to receiving a FIP VLAN discovery frame; and
respond to the at least one end node with a FIP solicitation comprising FCoE VLANs for some or all of the one or more FCFs in response to receiving a FIP discovery solicitation.

3. The system as recited in claim 1, wherein the SDN controller is further configured to:
receive a FIP login (FLOGI) forwarded from the at least one end node;
forward the FLOGI to an appropriate FCF;
receive an acceptance response to the FLOGI from the appropriate FCF;
examine the acceptance response to determine a fiber channel identification (FC-ID) field;
add a flow to the appropriate FCF corresponding to how to reach a virtual port associated with this flow;
send a FIP login response to the at least one end node; and
add the flow to each SDN-capable switch indicated in the flow.

4. The system as recited in claim 1, wherein the one or more FCFs are configured to:
act as a SAN gateway for any storage-based communications received from and/or sent to the one or more SAN fabrics;
support a fiber channel over Ethernet (FCoE) session with the at least one end node when the at least one end node is located in the one or more SAN fabrics; and
periodically send a unicast FIP advertisement frame to the SDN controller.

5. The system as recited in claim 1, wherein the one or more SDN-capable switches are further configured to:
receive a FIP virtual local area network (VLAN) discovery frame from the at least one end node;
forward the FIP VLAN discovery frame to the SDN controller when it is a first frame sent to an unknown media access control (MAC) address;
receive from the SDN controller at least one of a FIP VLAN request and a FIP solicitation; and
forward the at least one of the FIP VLAN request and the FIP solicitation to the at least one end node in response to receiving the at least one of the FIP VLAN request and the FIP solicitation.

6. The system as recited in claim 1, wherein each SDN-capable switch is further configured to:
receive a flow command from the SDN controller that instructs how to reach the a FCF to which the at least one end node is connected;
forward the flow command to all other SDN-capable switches in a flow path between the SDN-capable switch and the FCF to which the at least one end node is connected to start bandwidth programming; and
send an acknowledgment to the SDN controller upon completion of the bandwidth programming.

7. The system as recited in claim 1, wherein the at least one end node is configured to perform explicit logout from a fiber channel over Ethernet (FCoE) session with a FCF, and wherein upon receiving a logout request from the at least one end node, the FCF forwards the logout request to the SDN controller which is configured to inform each SDN-capable switch connected to the at least one end node in a flow path to remove the flow corresponding to both a virtual network (VN) port on the FCF and the FCF.

8. A computer program product, the computer program product comprising a non-transitory computer readable storage medium having program instructions embodied therewith, the program instructions being readable and/or executable by a software defined network (SDN) controller to cause the SDN controller to:
communicate with and program, by the SDN controller, one or more SDN-capable switches when the one or more SDN-capable switches are connected to the SDN controller;
collect, by the SDN controller, information from one or more fiber channel forwarders (FCFs) via fiber channel initialization protocol (FIP) advertisement frames when the one or more FCFs are connected to the SDN controller, the information corresponding with each of the one or more FCFs;
create and manage, by the SDN controller, a FCF database, the FCF database comprising the information that corresponds with each of the one or more FCFs;

send, by the SDN controller, a flow command to the one or more SDN-capable switches that instructs each SDN-capable switch how to reach a FCF to which at least one end node is connected; and receive, by the SDN controller, an acknowledgment from the one or more SDN-capable switches upon completion of bandwidth programming for all SDN-capable switches in a flow path to the at least one end node which is connected to the FCF, wherein the one or more FCFs are configured to connect to the one or more SDN-capable switches, one or more storage area network (SAN) fabrics, and one or more local area network (LAN) fabrics.

9. The computer program product as recited in claim 8, wherein the program instructions are further readable and/or executable by the SDN controller to:

receive, by the SDN controller, at least one of: a FIP virtual local area network (VLAN) discovery frame and a FIP discovery solicitation, forwarded from at least one end node connected directly or indirectly to the one or more SDN-capable switches and/or the one or more FCFs;

check, by the SDN controller, the FCF database for fiber channel over Ethernet (FCoE) VLANs;

respond, by the SDN controller, to the at least one end node with a FIP VLAN request comprising FCoE VLANs for some or all of the one or more FCFs in response to receiving the FIP VLAN discovery frame; and respond, by the SDN controller, to the at least one end node with a FIP solicitation comprising FCoE VLANs for some or all of the one or more FCFs in response to receiving the FIP discovery solicitation.

10. The computer program product as recited in claim 9, wherein the FIP VLAN discovery frame is sent to the SDN controller when it is a first frame sent to an unknown media access control (MAC) address.

11. The computer program product as recited in claim 8, wherein the program instructions are further readable and/or executable by the SDN controller to:

receive, by the SDN controller, a FIP login (FLOGI) forwarded from at least one end node;

forward, by the SDN controller, the FLOGI to an appropriate FCF;

receive, by the SDN controller, an acceptance response to the FLOGI from the appropriate FCF;

examine, by the SDN controller, the acceptance response to determine a fiber channel identification (FC-ID) field;

add, by the SDN controller, a flow to the appropriate FCF corresponding to how to reach a virtual port associated with this flow;

send, by the SDN controller, a FIP login response to the at least one end node; and add, by the SDN controller, the flow to each SDN-capable switch indicated in the flow.

12. The computer program product as recited in claim 8, wherein the program instructions are further readable and/or executable by the SDN controller to:

program, by the SDN controller, one or more flows into each node detailing how to reach the one or more FCFs;

mark, by the SDN controller, each programmed flow as a bandwidth aware flow on the one or more SDN-capable switches; and instruct, by the SDN controller, each switch in a first path to perform backpressure flow via priority flow control (PFC) when a bandwidth in the first path exceeds a predetermined bandwidth threshold.

13. A computer program product, the computer program product comprising a non-transitory computer readable storage medium having program instructions embodied therewith, the program instructions being readable and/or executable by a fiber channel forwarder (FCF) to cause the FCF to:

act as a storage area network (SAN) gateway for any storage-based communications received from and/or sent to one or more SAN fabrics connected to the FCF;

support a fiber channel over Ethernet (FCoE) session with at least one end node connected directly or indirectly to one or more software defined network (SDN)-capable switches and/or the FCF when the at least one end node is located in the one or more SAN fabrics;

receive, from the SDN controller, one or more flows that detail a path that includes the FCF and one or more other nodes; and periodically send a unicast fiber channel initialization protocol (FIP) advertisement frame to a SDN controller connected to the FCF and the one or more SDN-capable switches.

14. The computer program product as recited in claim 13, wherein the program instructions are further readable and/or executable by the FCF to:

receive, from the SDN controller, a FIP login (FLOGI) forwarded from the at least one end node;

determine, by the FCF, whether to allow the at least one end node to join a FCoE session; and send, to the SDN controller, an acceptance response to the FLOGI when it is determined to allow the at least one end node to join the FCoE session; and send, to the SDN controller, a rejection response to the FLOGI when it is determined to not allow the at least one end node to join the FCoE session.

15. The computer program product as recited in claim 13, wherein the program instructions are further readable and/or executable by the FCF to:

receive a logout request from the at least one end node to leave a fiber channel over Ethernet (FCoE) session with the FCF;

forward the logout request to the SDN controller; and remove all flows corresponding to the at least one end node.

* * * * *